United States Patent
Kleinert et al.

(10) Patent No.: US 7,410,038 B2
(45) Date of Patent: Aug. 12, 2008

(54) LOCKING UNIT

(75) Inventors: Dieter Kleinert, Memmingen (DE); Georg Scherer, Kirchheim (DE); Winfried Willburger, Oberopfingen (DE); Robert Müller, Mindelheim (DE)

(73) Assignee: SVM Schultz Verwaltungs-GmbH & Co. KG, Memmingen (DE)

( * ) Notice: Subject to any disclaimer, the term of this patent is extended or adjusted under 35 U.S.C. 154(b) by 0 days.

(21) Appl. No.: 10/680,114

(22) Filed: Oct. 8, 2003

(65) Prior Publication Data

US 2005/0098400 A1 May 12, 2005

(30) Foreign Application Priority Data

Oct. 11, 2002 (DE) .................. 102 47 588

(51) Int. Cl.
*F16F 9/32* (2006.01)
*F15B 15/26* (2006.01)

(52) U.S. Cl. .................. 188/300; 188/31; 303/89; 92/30

(58) Field of Classification Search .......... 188/31, 188/69, 300, 67; 303/89; 92/23–30; 74/411.5, 74/577 S, 473.21, 473.24; 192/219.4, 219.5, 192/220.2, 220.4; 292/336, 341.16; 91/41–42
See application file for complete search history.

(56) References Cited

U.S. PATENT DOCUMENTS

| | | | | | |
|---|---|---|---|---|---|
| 1,794,424 | A | * | 3/1931 | Smith et al. | 414/226.05 |
| 4,873,824 | A | * | 10/1989 | Cox | 60/545 |
| 4,987,968 | A | * | 1/1991 | Martus et al. | 180/272 |
| 5,540,138 | A | * | 7/1996 | Robbins, Jr. | 92/26 |
| 6,471,027 | B1 | * | 10/2002 | Gierer et al. | 192/219.5 |
| 6,554,373 | B1 | * | 4/2003 | Bill | 303/114.3 |
| 2004/0011609 | A1 | * | 1/2004 | Schmid | 188/265 |
| 2004/0037915 | A1 | * | 2/2004 | Dantlgraber | 425/589 |

FOREIGN PATENT DOCUMENTS

| | | |
|---|---|---|
| DE | 2164578 | 7/1973 |
| DE | 19820920 A1 | 11/1999 |
| DE | 10121024 | 11/2001 |
| DE | 10105637 A1 | 8/2002 |
| EP | 001408260 A1 * | 4/2004 |
| WO | WO02/10619 | 2/2002 |

OTHER PUBLICATIONS

STIC provided translations for DE19820920 and DE2164578.*

* cited by examiner

*Primary Examiner*—Melody M Burch
(74) *Attorney, Agent, or Firm*—Jacobson Holman PLLC

(57) ABSTRACT

A locking unit for the locking of the movement of a piston. An electromagnet is provided the armature, respectively the armature bar, of which acts on an operating element. The operating element co-operates with a catching element in such a way that the catching element blocks in a locking position the movement of the piston, respectively the catching element unlocks in an unlocking position the movement of the piston. Catching element and operating element co-operate surface-to-surface.

24 Claims, 2 Drawing Sheets

Figure 2:
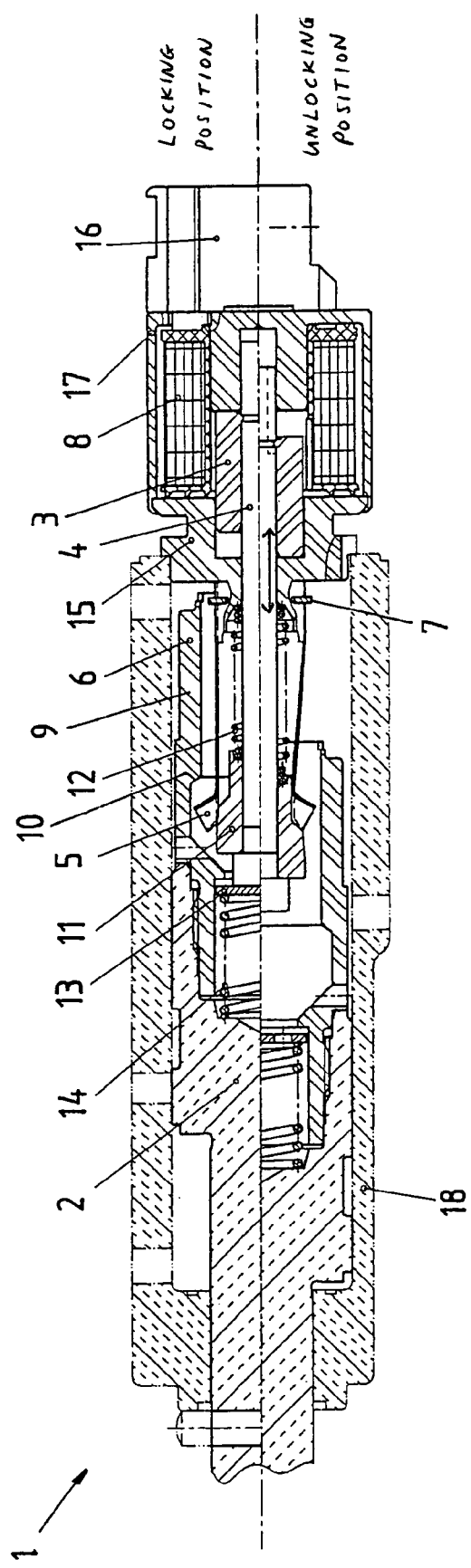

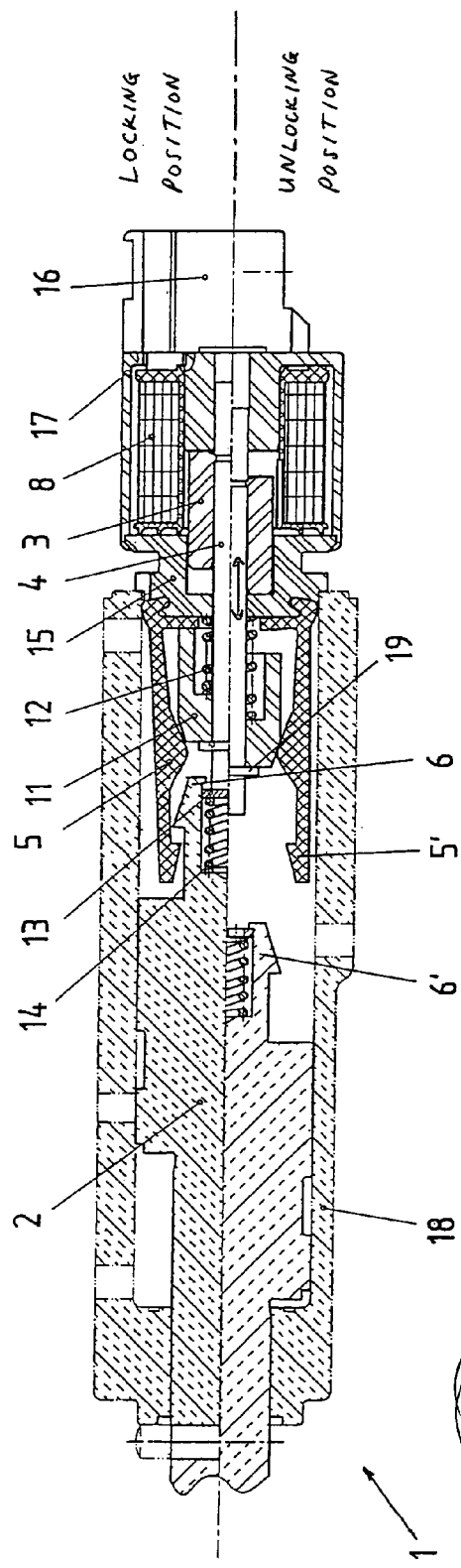
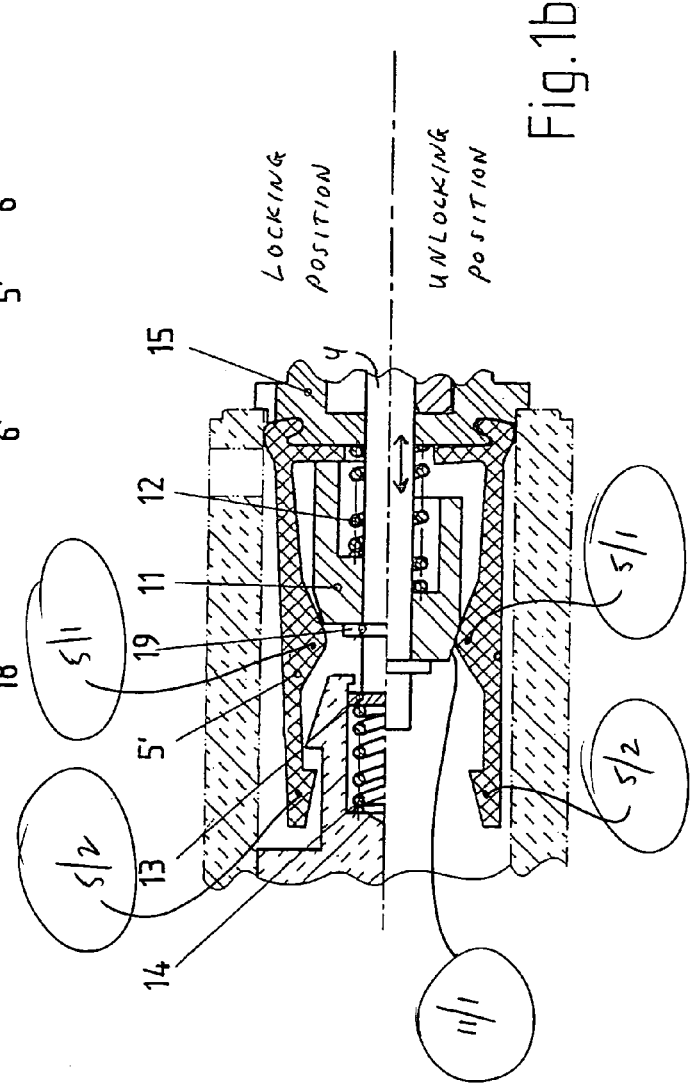
Fig. 1a
Fig. 1b

LOCKING UNIT

The invention refers to a locking unit for the locking of the movement of a piston which can be impinged with pressure, an electromagnet being provided the armature, respectively the armature bar, of which acting directly or indirectly on an operating element which co-operates with a catching element in such a way that the catching element blocks in a locking position the movement of the piston, respectively the catching element unlocks in an unlocking position the movement of the piston.

BACKGROUND OF THE INVENTION

Locking units described above are used in particular with the parking brakes in automatic transmissions.

A vehicle with manual gear shifting can be secured against unintended movement during standstill when the engine has been turned off by engaging a gear. With automatic transmissions, however, this is not possible because there is no frictional connection with the driven wheels when the engine has been turned off. Therefore automatic transmissions have a mechanic locking of the transmission driven shaft which has to be activated in the park position, that means it has to be set, and it prevents the car from moving.

The locking unit there acts together with the hydraulic circle of the automatic transmission. When the parking brake is set it is usually provided that the piston is unlocked. In the drive position, that is when the parking brake is not set, the piston impinged with pressure is locked. Usually there the piston rod of the piston acts on a catch which engages or does not engage according to the position of the parking brake into the driving lane.

The locking units used for that have balls as operating elements which are movably supported radial to the armature bar and because of the movements of the armature bar during driving are pressed outward in order to engage with a catching element and thus lock the movement of the piston.

In the currentless condition (usually in the park position) the unlocking position of the piston is achieved by means of a spring which moves the armature bar against the otherwise prevailing holding force of the electromagnet in such a way that the balls can recede radial to the inside and thus the movement of the piston is no longer blocked. The arrangement there is such that the unlocking position (park position) is passively safe, that means in the currentless condition the movement of the piston is not blocked, the piston is unlocked.

In the example shown here according to the state of the art the meshed park position corresponds with the unlocked piston, the out-of-gear park position corresponds with the locked piston. In the sense of the invention, however, it is also possible to reverse this connection, that means to use an unlocked piston when the parking brake is out-of-gear and vice versa.

The use of the balls as operating elements, however, leads to some disadvantages. The balls run in oil which, for example, is in contact on the pressure side on the piston. Therefore it cannot be excluded completely that, for example, rubbed-of parts of the gear or other soiling (for example chips) are being deposited into the locking region and thus obstruct the movement of the balls. If, however, the movement of the balls is not secured the function of the locking unit altogether is not guaranteed. Therefore the arrangement according to the state of the art is susceptible to soiling.

Furthermore a ball has only point-to-point contact to its surrounding surfaces. That means that the locking forces act only on small surfaces and the corresponding pressure stress is enormous. In the state of the art this is compensated by accordingly especially hardened parts, however, these parts are correspondingly expensive to manufacture.

BRIEF SUMMARY OF THE INVENTION

Referring to this state of the art it is an object of the invention to improve a locking unit as described in the beginning actually in such a way that it can be manufactured easily.

The problem is solved by a locking unit as described in the beginning where it is suggested that the catching element and the operating element co-operate surface to surface.

By means of this suggestion according to the invention it is achieved that the pressure stress for the catching element and the operating element are reduced considerably as the locking forces act on larger surfaces and therefore the pressure is reduced accordingly. However, if the force stress of the components is reduced correspondingly it will be possible to manufacture these components less expensively and therefore the corresponding producing effort won't be necessary anymore.

Simultaneously a simpler, solid construction results because the operating elements can now be formed larger without changing the dimensions of the apparatus altogether.

The invention is here in no way limited to the co-operating arrangement of the catching element, respectively the operating element, which is located at the piston or the cylinder, respectively with the armature bar or the armature.

Neither is it important in the context of the invention that the catching element, respectively the operating element, always co-operates with each other in the locking position as well as in the unlocking position. It is, however, provided, that the two elements co-operate at least during a change of the position, in the reversible case, if necessary, means being provided which achieve a corresponding movement.

According to the invention it proposed that the catching element and the operating element co-operate surface-to-surface. A co-operation surface-to surface is already seen in the sense of the invention when the catching element, respectively the operating element, co-operate linear. Already by means of that also a saving of material is achieved as the introduction of the forces point-to point, as it is known with the ball, is done along a line. Eventually, however, a linear embodiment in the sense of the invention means also a surface-to-surface contact because the effect according to the invention is also achieved by means of that, namely to reduce the surface stress in this component.

Here also the initial providing of a linear contact, respectively co-operation, of catching element and operating element can in the further operation of the locking unit change to a surface-to-surface contact which is produced, for example, by material fatigue. By corresponding tolerance balances this may be compensated. In this respect also this variant belongs to the invention.

Furthermore the invention proposes that the catching element has a shoulder, collar, projection or a holding nozzle which co-operates with an operating element designed as a hook, catch, projection or shoulder. Here in particular a positive interlocking co-operation is an advantage, but not the only condition. Here the suggested construction types at the elements can be manufactured easily.

In another embodiment according to the invention it is provided that the operating element can move flexibly. By means of a swivelling movement it is easily possible to bring the operating element into engagement, respectively co-operation, with the catching element and also to remove it again from it. In a clever way here the longitudinal movement of the armature bar for example is turned around by correspondingly inclined surfaces or planes to a swivelling movement of the flexibly arranged operating element.

For example in one variant of the invention it is provided that the operating element can be moved elastically, respectively is under prestress, and that the operating element moves the catching element against the prestress power resulting from that either into the locking or into the unlocking position. Of course it is, according to the invention, also possible to guide and control the movements of the operating and catching element in connecting link-like paths, however, this could under certain circumstances in rough operation, in particular with soiled oil and so on, not be favourable. But the arrangement in such a way, that a prestress power is provided, has the result that the operating element co-operates only for one step, namely for the forming of the locking position or for the forming of the unlocking position, with the catching element. In this case then the armature, respectively the armature bar, (directly or indirectly) acts against this prestress power. Here the invention reaches additionally an improvement of the reliability because no more tiny balls are used the movement of which could be obstructed easily by chips deposited with the oil.

There are several variants how the operating element is formed in order to provide a corresponding prestress power. According to the invention it is proposed here that the operating element has a tension spring, respectively a tension spring acts upon it, or it consists of elastic material. The elastic material may be, for example synthetic material or spring steel and so on. These parts may be also formed here as punching bent components which keep the production expenses correspondingly low.

Besides the arrangement of a prestress for the movement of the operating element it is, however, also possible that the operating element is forced guided by the movement of the armature, respectively the armature bar. For example it is possible with the aid of the armature, respectively the armature bar, to design a connecting link path in such a way that the operating element is forced guided in the locking and/or unlocking position. With such a design maybe also the arrangement of an elastic or spring element for the operating element is not necessary or the forced guide of the operating element can be supported accordingly.

The principle proposed according to the invention is suitable here for the use in two different variants. At first it is possible that the operating element is held in the locking position because of the prestress power and the movement of the armature, respectively the armature bar, acts on the operating element in such a way that the piston is unlocked. In a kinematic reversal of this suggestion it is possible that the operating element is held in the unlocking position because of the prestress power and the movement of the armature, respectively the armature bar locks the piston. Depending on the desired switching condition the arrangement is selected and realised accordingly.

The field of application of the locking unit is not limited to the parking brake of automatic transmissions mentioned in the beginning. There may also be other application fields, for example a hydraulic control and the like, where a corresponding locking unit is an advantage. It is provided that the locking unit has an electromagnet which usually is formed by a coil through which the current flows and in which an armature, respectively an armature bar, is moved against the power of a spring. Such simple concepts known in the state of the art allow the electromagnet to take two positions, the first position being dominated by the arrangement of the spring, because no current flows through the coil, the other position being then the "attracted" position, namely when the armature (if necessary with hydraulic support) is attracted by the coil through which the current flows and the resulting power is larger than the power of the spring.

It is an advantage here that the locking position is characterised by a coil which is flown through by current. By means of that an active safety can be provided in a simple way.

A passive safety is given, for example, by the fact that the unlocking position is characterised by a currentless coil. If the current supply of the electromagnet breaks down, for example, when the vehicle is parked or another problem occurs (for example a short circuit and so on) the magnetic field collapses and the spring force dominates the position of the armature bar in the electromagnet. As the operating element is moved directly or indirectly by the armature bar thus the operating element is brought from the locking into the unlocking position. The unlocked, released piston then can be moved in such a way that a catch can be brought into the driving lane for the blocking of the driving lane.

Here the invention again allows two variants. According to the invention it is possible that the locking position is characterised by a coil through which the current flows or, on the other hand, the unlocking position is characterised by a coil through which the current flows.

According to the invention it is provided that the piston carries the catching element. However, in the sense of the invention it is equally possible, too, to provide a kinematic reversal, namely in such a way that the piston carries the operating element and the catching element in the cylinder is essentially stationary, for example linked, in particular flexibly, with the yoke of the electromagnet. By means of a corresponding arrangement of the armature bar to the piston such another other concept according to the invention is possible without any problems.

It is an advantage if the operating element is designed like a hook or a catch. It is then possible without any problems to adjust the seize of the hook and the catches according to the maximum pressure stress in order to achieve thus a surface-to-surface co-operation of the catching element with the operating element. It is convenient if the catching element is also designed as plane as possible, for example corresponding projections, flanges or collars and so on having to be provided for example as catching element at the piston.

In a preferred embodiment of the invention it is provided that on the armature, respectively the armature bar, a bolt is located and the bolt acts on the operating element by means of the movement of the armature. Besides the possibility that the armature, respectively the armature bar, acts directly on the operating element it is possible to achieve, by means of the arrangement of a bolt, for example also a connecting link-like guide.

In particular it is proposed in another variant according to the invention that on the bolt at least one bevelling, in particular a tapered bevelling is provided for the co-operation with the operating element. Here several tapered bevellings may be arranged one beside the other, respectively axially (with reference to the armature bar) one behind the other.

In these presented variants the operating element is basically fixed within the locking unit, that means the armature moves relatively to the operating element. If necessary the operating element is supported here flexibly in the housing. In another variant of the invention it is provided that the operating element moves together with the movement of the armature and at least one other operating element is provided which acts during the movement of the operating element on this operating element. In this embodiment of the invention the operating element on the armature bar also moves and, for example, projecting operating means are arranged in the housing which act for example on the also flexibly designed operating element and thus perform the co-operation of the operating element with the catching element. Therefore the invention also comprises with reference to the armature stationary as well as movable operating elements.

Usually the locking unit may have a construction which is essentially rotationally symmetrical, where it is possible without any problems in a corresponding coaxial guide that the operating element co-operates from the outside with the catching element in particular in an embracing way. Such an arrangement allows in particular the forming of large contact surfaces in order to keep low again the respective surface stress.

In the same way it is, of course, possible, that the operating element co-operates from the inside with the catching element.

The invention is not limited to the rotationally symmetrical embodiment, other geometric forms can also be used.

Furthermore it is provided according to the invention that the catching element is designed flexibly. The invention reserves the flexible construction either of the catching element or the operating element or both together. If necessary here also corresponding means are provided which act during the movement of the piston, where also the catching element is arranged, on the piston and therefore result in a flexible movement.

According to the invention it is also possible that the operating element is designed as a movable component. It is, for example, possible that the operating element is designed as locking block which is guided for example on a connecting link path or in a cage. By means of such an embodiment also a surface-to-surface co-operation with the catching element is possible. It is provided here that the operating element designed as movable component is fastened neither on the armature nor the armature bar nor fixed with the housing. However, it is provided that, if necessary, there are springs for the guide of the operating element designed as locking block.

In the preferred variant of the invention it is provided that the piston has an absorbing spring acting as longitudinal tolerance balance.

The invention refers in particular also to an automatic transmission with a locking unit as described in the beginning, the locking position being activated in the park position of the transmission. Conveniently it is provided here that in the park position the coil is currentless. By means of that it is achieved that a locking position exists in the park position, the coil of the electromagnet being currentless. In this passive position a reliable locking is achieved and the transmission is correspondingly engaged, respectively blocked. It is also convenient not to waste electric energy in the locking position which had to come from the car's battery and would discharge it accordingly.

BRIEF DESCRIPTION OF THE DIFFERENT VIEWS OF THE DRAWINGS

In the drawing the invention is shown schematically. The figures show:

FIGS. 1a and 2a section of the locking unit according to the invention in two different positions each and FIG. 1b a detail of FIG. 1a.

DETAILED DESCRIPTION OF THE PREFERRED EMBODIMENT

The locking unit 1 according to the invention comprises a piston 2 which can move longitudinally in a housing 18. By means of several borings there is a corresponding pressure of hydraulic oil, for example at the backside of the piston.

In all figures two positions each are shown. In each upper part of the figure the locking position is shown, in each lower part of the figure the unlocking position.

On the right hand side in FIG. 1a, respectively 2, the electromagnet is located. The connecting region is covered by the cap 16. The electromagnet is formed essentially by the coil 8 through the current flows in order to activate the electromagnet, as well as an armature 3, respectively an armature bar 4 connected with the armature 3.

In the upper part of the figure the armature 3 is attracted by the electromagnet, in the lower part of the figure there is a corresponding gap which occurs because of the spring 12 which tries to move the armature bar to the left hand side against the power of the electromagnet.

The armature bar 4 has on its left hand side end which projects from the electromagnet a bolt 11. The spring 12 is supported on this bolt 11 and eventually lies on the other side on the yoke 15.

As soon as current flows through the electromagnet, respectively the coil 8, the spring 12 is compressed when the armature bar 4 and also the bolt 11 move to the right hand side. In the currentless condition the spring 12 relaxes again and the bolt 11 moves to the left hand side.

The armature bar 4 acts via the bolt 11 indirectly on the operating element 5.

The operating element 5 is designed hook-like in the example shown in FIG. 1a and in the upper part of the figure not yet in direct contact with the bolt 11 (see enlargement in FIG. 1b). The bolt 11 has on its front end a flattening which co-operates with a corresponding catch of the operating element 5. In the phase where the bolt 11 does not yet act upon the operating element 5 it becomes clear that the operating element 5 is arranged as a conical inwardly extending projection. By means of that the front end of the operating element 5 moves so far to the inside that the catch arranged on the front end co-operates in a holding way with a corresponding collar on the piston. The piston now carries on its front end which faces the magnet coil 8 the catching element 6 with the collar formed like a plane.

In the locking position shown in the upper part of FIG. 1a it is clear that, when the piston 2 is moved to the left hand side, this movement is blocked by the operating element 5 which projects inwards. The catching element 6 is caught by the operating element 5. The movement of the piston 2 is locked. On the other hand the lower part of FIG. 1a shows the unlocked position. The bolt 11 here is located so far to the left hand side that its outer flank slides on the conical inwardly extending projection of the operating element 5 and presses the operating element outwards in a radial direction. This is carried out by means of the prestress power which is based on the elasticity of the operating element 5. The operating element 5', respectively its front end, is released from the catching element 6' and allows a movement of the piston to the left hand side, as shown. The piston is not locked, it is unlocked.

The operating element 5 shown in the embodiment according to FIG. 1a is held in the locking position (upper part of the figure) because of the prestress power and the movement of the armature, respectively the armature bar, unlocks the piston 2.

The catching element 6 is here provided on the piston 2 and carries a collar or projection, which co-operates non-positive and positive interlocking with the corresponding hook or catch of the operating element 5, 5'. In FIG. 1a a construction is chosen which is essentially rotational symmetrical. Therefore it is possible to arrange a plurality of operating elements 5 provided along the circumference of the piston, respectively the catching element 6. By means of these it is possible to engrave a large locking force without additional measurements like hardening of the workpiece and so on.

In the embodiment according to FIG. 1a the operating element 5 is designed claw-like and grips over the catching element 6 from the outside. Vice versa the catching element 6 dips into the operating element 5.

It is an advantage here that the piston 2 with the catching element 6 is designed as (comparatively simple) lathe work. This reduces considerably the production expenses of this component.

The electromagnet carries a magnetically conductive case 17 which is connected with the cap 16.

The piston 2 has on its front end which faces the electromagnet an absorbing spring 14 which is supported, secured with the disc 13, on the front end of the armature bar 4. By means of that the hard impact of the piston 2 on the armature bar 4 is avoided and the stress of the armature bar 4 is reduced considerably. Simultaneously it is possible that the absorbing spring 14 is used as longitudinal tolerance balance and therefore serves for two different purposes. The bolt 11 sits close on the armature bar 4 on a disc 19, the disc 19 facing the piston 2.

The operating element 5 is in the example shown here injection-moulded or clipped on the yoke 15, the yoke 15 connecting the electromagnet in the direction of piston. The yoke 15 has an opening through which the armature bar comes out into the direction of the piston.

In FIG. 2 a variant of the locking unit 1 according to the invention is shown. In this embodiment the catching element 6 of the piston 2 is, if necessary, also designed as separate component and, for example, caulked with it. The catching element 6 is designed here as a sleeve, the sleeve 6 here covering the operating element 5. In the sleeve 6 a shoulder, projection or flange is provided which co-operates in the locking position (see upper part of the figure) with the operating element 5.

The operating element 5 here is designed for example as punching component and carries on its front end which faces the piston 2 a corresponding holding catch which co-operates in a holding way with the projection of the catching element 6.

Here also the operating element 5 is activated indirectly via the bolt 11. The bolt 11 has an inclined surface, the operating element 5 has a prestress in the direction of the bolt 11. In the unlocking position (lower part of FIG. 2) the bolt is located so far to the left hand side that the shoulder is activated and allows a radial movement of the catch element 6 in such a way that the catch element 6 does no more engage at the shoulder or projection 10 in the sleeve of the catching element 6 holding and blocking it. The inclined surface provided at the bolt 11 becomes active during a movement of the armature bar to the right hand side, by means of which the operating element 5 is pressed outward radial and grabs behind the projecting shoulder in the sleeve. A movement of the sleeve, respectively the piston, to the left hand side is thus blocked.

In the embodiment according to FIG. 2 the sleeve-like catching element 6 surrounds the operating element 5, by means of which the operating element 5 co-operates from the inside with the catching element 6.

In contrast to FIG. 1a FIG. 2 shows that the operating element 5 is held in the unlocking position because of the prestress power and the movement of the armature 3, respectively the armature bar 4, locks the piston 2. Vice versa it is shown in FIG. 1a that the operating element 5 is held in the locking position because of the prestress power and the movement of the armature 3, respectively the armature bar 4, unlocks the piston 2.

In order to enhance the prestress power of the operating element 5 in this embodiment a tension spring 7 is provided which is arranged in the projection region of the operating element 5. This tension spring 7 enlarges the prestress, the operating element 5 being even more effectively guided to the bolt 11 and its inclined surfaces. Furthermore it is provided that the tension spring 7 serves also for fastening the operating element 5 on the yoke 15.

Although the invention has been described by exact examples which are illustrated in the most extensive detail, it is pointed out that this serves only for illustration and that the invention is not necessarily limited to it because alternative embodiments and methods become clear for experts in view of the disclosure. Accordingly changes can be considered which can be made without departing from the contents of the described invention.

The invention claimed is:

1. Locking unit for locking of movement of a piston which can be impinged with pressure, said locking unit comprising
   a piston,
   an electromagnet provided with an armature bar acting on an operating element, said operating element cooperating with a catching element of the piston in such a way that, in a locking position of the pistons, the catching element blocks continued movement of the piston, and, in an unlocking position of the piston, the catching element allows movement of the piston,
   the catching element and the operating element co-operate surface to surface by axial movement toward and away from each other,
   a bolt on the armature bar, the bolt acting through movement of the armature bar on the operating element, and
   at least one tapered beveling of the bolt co-operating with a conical inwardly extending projection of the operating element by slidingly engaging the at least one tapered beveling of the bolt with the conical inwardly extending projection of the operating element during movement of the armature bar to release the operating element from engaging the catching element and preventing movement of the piston,
   the conically inwardly extending projection being located between the catching element and the electromagnet.

2. Locking unit according to claim 1, wherein the catching element is a hook.

3. Locking unit according to claim 1, wherein the operating element moves flexibly.

4. Locking unit according to claim 1, wherein the operating element is under prestress, and the operating element holds the catching element against the prestress resulting from one of the locking position and the unlocking position.

5. Locking unit according to claim 1, wherein at least one of a tension spring acts upon the operating element and the operating element comprises elastic material.

6. Locking unit according to claim 1, wherein the operating element is guided by the movement of the armature bar.

7. Locking unit according to claim 1, wherein the operating element is held in the locking position because of a prestress power and the movement of the armature bar acts on the operating element in such a way that the piston is unlocked.

8. Locking unit according to claim 1, wherein the operating element is held in the unlocking position because of a prestress power and the movement of an armature locks the piston.

9. Locking unit for locking of movement of a piston which can be impinged with pressure, said locking unit comprising
an electromagnet provided with an armature bar acting on an operating element, said operating element cooperating with a catching element in such a way that, in a locking position of the piston, the catching element blocks movement of the piston, and, in an unlocking position of the piston, the catching element releases the movement of the piston,
the catching element and the operating element co-operate surface to surface by axial movement toward and away from each other,
a bolt on the armature bar, the bolt acting through movement of the armature bar on the operating element, and
at least one tapered beveling of the bolt co-operating with the operating element by slidingly engaging the operating element during movement of the armature bar,
the electromagnet having a coil through which current flows and the armature bar moving against the power of a spring.

10. Locking unit according to claim 1, wherein the locking position is maintained by a coil of the electromagnet through which current flows.

11. Locking unit according to claim 1, wherein the unlocking position is characterised by a coil of the electromagnet through which the current flows.

12. Locking unit according to claim 1, wherein the operating element is moved together with the movement of an armature and at least one further moving means is provided which acts on the operating element when the operating element is moved.

13. Locking unit according to claim 1, wherein the catching element is formed by a projection provided on the piston.

14. Locking unit according to claim 1, wherein the catching element is formed by a shoulder provided in a sleeve.

15. Locking unit according to claim 1, wherein the operating element is a movable component.

16. Locking unit according to claim 1, wherein the operating element is includes a hook.

17. Locking unit according to claim 1, wherein the catching element is flexible.

18. Locking unit according to claim 1, wherein the operating element co-operates with the catching element from outside.

19. Locking unit according to claim 1, wherein the operating element co-operates with the catching element from inside.

20. Locking unit according to claim 1, wherein the piston with the catching element is a lathe work piece.

21. Locking unit according to claim 1, wherein the operating element is a bent component.

22. Locking unit according to claim 1, wherein the piston impinged with pressure is held in the locking position by the operating element as the coil flown through by current of the electromagnet attracts an armature in such a way that the operating element co-operates with the catching element in a holding way.

23. Locking unit for locking of movement of a piston which can be impinged with pressure, said locking unit comprising
an electromagnet provided with an armature bar acting on an operating element, said operating element cooperating with a catching element in such a way that, in a locking position of the piston, the catching element blocks the movement of the piston, and, in an unlocking position of the piston, the catching element releases the movement of the piston,
the catching element and the operating element co-operate surface to surface by axial movement toward and away from each other,
a bolt on the armature bar, the bolt acting through movement of the armature bar on the operating element, and
at least one tapered beveling of the bolt co-operating with the operating element by slidingly engaging the operating element during movement of the armature bar, the armature bar sitting close on the piston in the locking position supported by a spring.

24. Locking unit for locking of movement of a piston which can be impinged with pressure, said locking unit comprising
an electromagnet provided with an armature bar acting on an operating element, said operating element cooperating with a catching element in such a way that, in a locking position of the piston, the catching element blocks the movement of the piston, and, in an unlocking position of the piston, the catching element releases the movement of the piston,
the catching element and the operating element co-operate surface to surface by axial movement toward and away from each other,
a bolt on the armature bar, the bolt acting through movement of the armature bar on the operating element, and
at least one tapered beveling of the bolt co-operating with the operating element by slidingly engaging the operating element during movement of the armature bar, the piston carrying an absorbing spring as a longitudinal tolerance balance.

* * * * *